US008583610B2

(12) United States Patent
Arwe et al.

(10) Patent No.: US 8,583,610 B2
(45) Date of Patent: Nov. 12, 2013

(54) DYNAMICALLY EXTENDING A PLURALITY OF MANAGEABILITY CAPABILITIES OF IT RESOURCES THROUGH THE USE OF MANAGEABILITY ASPECTS

(75) Inventors: John E. Arwe, Poughkeepsie, NY (US);
Jeffrey A. Frey, New Paltz, NY (US);
John J. Rofrano, Mahopac, NY (US);
Andrew N. Trossman, North York (CA);
Hendrik Wagner, Stuttgart (DE);
Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 12/041,696

(22) Filed: Mar. 4, 2008

(65) Prior Publication Data
US 2009/0228517 A1 Sep. 10, 2009

(51) Int. Cl.
*G06F 7/00* (2006.01)
*G06F 17/00* (2006.01)

(52) U.S. Cl.
USPC .......................................... 707/694; 707/689

(58) Field of Classification Search
USPC .......................... 707/999.101, 802, 689, 694
See application file for complete search history.

(56) References Cited

U.S. PATENT DOCUMENTS

| | | | |
|---|---|---|---|
| 5,878,431 A * | 3/1999 | Potterveld et al. | 707/694 |
| 6,154,767 A | 11/2000 | Altschuler et al. | |
| 6,477,645 B1 | 11/2002 | Drews | |
| 6,578,086 B1 | 6/2003 | Regan et al. | |
| 6,738,819 B1 | 5/2004 | Li et al. | |
| 6,901,446 B2 | 5/2005 | Chellis et al. | |
| 7,152,076 B2 | 12/2006 | Sundararajan et al. | |
| 7,165,118 B2 | 1/2007 | Ballinger et al. | |
| 7,200,530 B2 | 4/2007 | Brown et al. | |
| 7,610,386 B1 | 10/2009 | Martinez et al. | |
| 7,698,398 B1 | 4/2010 | Lai | |
| 7,814,226 B2 | 10/2010 | Patrick | |
| 7,840,669 B2 | 11/2010 | Dutta et al. | |

(Continued)

FOREIGN PATENT DOCUMENTS

CN 1691622 A 11/2005

OTHER PUBLICATIONS

Graham, Web Services Base Notification 1.3 (WS-Base Notification) OASIS Standard, Oct. 1, 2006, pp. 1-68.

(Continued)

*Primary Examiner* — Alexey Shmatov
(74) *Attorney, Agent, or Firm* — Cantor Colburn LLP; William A. Kinnaman, Jr.

(57) ABSTRACT

Extending a plurality of manageability capabilities of manageable information technology (IT) resources utilize an "aspect of" association for describing a relationship between a first object representing a manageable resource playing a role of a subject and one or more additional objects each playing a role of an aspect. The "aspect of" association establishes an overall manageability function for the first object representing a manageable resource and the one or more additional objects as a logical composition of a plurality of manageability capabilities. The manageability capabilities are provided using distinct implementation classes for supporting a specific role, and for supporting management-discipline related aspects and behaviors needed by each of a plurality of resource management applications for managing the manageable resource. The one or more additional objects have an aspect life cycle that is bounded maximally by a subject lifecycle of the first manageable resource.

14 Claims, 5 Drawing Sheets

(56) References Cited

U.S. PATENT DOCUMENTS

| | | |
|---|---|---|
| 8,032,557 B1 | 10/2011 | Vijendra et al. |
| 2002/0082858 A1 | 6/2002 | Heddaya et al. |
| 2002/0112139 A1 | 8/2002 | Krause et al. |
| 2003/0055945 A1 | 3/2003 | Bear et al. |
| 2003/0198189 A1 | 10/2003 | Roberts et al. |
| 2004/0024877 A1 | 2/2004 | Celle |
| 2004/0230943 A1 | 11/2004 | Pourheidari et al. |
| 2004/0237094 A1 | 11/2004 | Vambenepe et al. |
| 2005/0132381 A1 | 6/2005 | Fiammante et al. |
| 2005/0222969 A1 | 10/2005 | Yip et al. |
| 2006/0026552 A1 | 2/2006 | Mazzitelli et al. |
| 2006/0047742 A1 | 3/2006 | O'Neill et al. |
| 2006/0048097 A1 | 3/2006 | Doshi |
| 2006/0092950 A1 | 5/2006 | Arregoces et al. |
| 2006/0123116 A1 | 6/2006 | Rahman et al. |
| 2006/0146991 A1 | 7/2006 | Thompson et al. |
| 2006/0165040 A1 | 7/2006 | Rathod |
| 2006/0212473 A1* | 9/2006 | Carusi et al. .............. 707/103 R |
| 2006/0253420 A1 | 11/2006 | Hinton et al. |
| 2006/0277606 A1 | 12/2006 | Yunus et al. |
| 2006/0288071 A1 | 12/2006 | Bigioi et al. |
| 2007/0022154 A1 | 1/2007 | Saunders et al. |
| 2007/0169199 A1 | 7/2007 | Quinnell et al. |
| 2007/0198667 A1 | 8/2007 | Behrendt et al. |
| 2007/0294366 A1 | 12/2007 | Ozzie et al. |
| 2008/0127047 A1 | 5/2008 | Zhang et al. |
| 2008/0141280 A1 | 6/2008 | Azulai |
| 2009/0043786 A1 | 2/2009 | Schmidt et al. |
| 2009/0089408 A1 | 4/2009 | Bou-Diab et al. |
| 2009/0132708 A1 | 5/2009 | Hayward |
| 2009/0144343 A1 | 6/2009 | Holt et al. |
| 2010/0049833 A1 | 2/2010 | Matthews et al. |
| 2010/0122328 A1 | 5/2010 | Betzler et al. |
| 2010/0131650 A1 | 5/2010 | Pok et al. |
| 2010/0235844 A1 | 9/2010 | Arwe et al. |
| 2010/0332490 A1 | 12/2010 | Bauer et al. |

OTHER PUBLICATIONS

Robert C. Chalmers and Kevin C. Almeroth, "On the Topology of Multicast Trees", IEEE/ACM Transactions on Networking (TON), vol. 11, Issue 1; Feb. 2003, pp. 153-165.

Katia Obraczka and Grig Gheorghiu, "The Performance of a Service for Network-Aware Applications". Symposium on Parallel and Distributed Tools archive, Proceedings of the SIGMETRICS symposium on Parallel and distributed tools, Welches, Oregon, United States, pp. 81-91, 1998.

K. Taura, K. Kaneda, T. Endo, A. Yonezawa, "Phoenix: a Parallel Programming Model for Accomodating Dynamically Joining/Leaving Resources", Principles and Practice of Parallel Programming, San Diego, California, USA, pp. 216-229; 2003.

Lan Wu, "Service Discovery for Personal Networks" A Thesis Report, Presented to the INFOTECH Program of University of Stuttgart, pp. 1-100, Dec. 2004.

* cited by examiner

DYNAMICALLY EXTENDING A PLURALITY OF MANAGEABILITY CAPABILITIES OF IT RESOURCES THROUGH THE USE OF MANAGEABILITY ASPECTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to the field of computer systems management and, in particular, to methods, systems, and computer program products for extending the manageability capabilities of information technology (IT) resources through the use of manageability aspects.

2. Description of Background

One of the primary goals of an information technology (IT) resource model within an IT management system is to define programmatic representations of manageability interfaces of IT manageable resources. Using web service concepts, each IT resource type is represented as an XML schema component. The XML schema component is then logically extended with operational behavior. Operational behavior refers to the introduction of web service operations to a stateful object represented by the XML schema component. Requestors access properties, operations, and events of a manageable resource through standard interfaces defined in standards such as CIM, web services distributed management (WSDM), and through other organizations extending base manageability capabilities.

One of the most important, and least understood, tenets in expressing the manageability of an IT resource is that the interfaces expressing the manageability function of a resource are an integral part of the resource itself. In other words, the very existence of a core manageability interface of a manageable resource is dependent upon the existence of the manageability resource to which it applies. A resource cannot express, implement, or make available a manageability interface if the resource does not exist.

Determining the composition of a manageability interface for a resource poses problems related to the maintenance of the structural integrity of the manageable resource entity itself. In traditional resource management systems, each management function takes on the responsibility of representing the same IT resources, with each function representing a particular perspective for the manageable resources. As a result, the same manageable resources are represented by multiple implementations across the system with no coherence with respect to the resource identity or lifecycle management of the resource. As a further consequence, programming logic is introduced in an attempt to correlate the different names and identities of the various expressions of the manageable resources in order to achieve some level of coherence.

In traditional systems, few implementations of manageability interfaces represent an essential state or life cycle of the resource entity itself. Rather, the implementations represent specific manageability aspects of an IT resource with no formal means to relate the manageability extensions to the identity or life cycle of the actual manageable resource entity being represented. In view of the foregoing considerations, what is needed is an improved technique for extending the manageability capabilities of IT resources.

SUMMARY OF THE INVENTION

Computer-executable methods for extending a plurality of manageability capabilities of manageable information technology (IT) resources utilize an "aspect of" association for describing a type of relationship between a first object representing a manageable resource playing a role of a subject and one or more additional objects, each playing a role of a manageable resource manageability aspect. The "aspect of" association establishes an overall manageability function for the first object and the one or more additional objects as a logical composition of a plurality of manageability capabilities. The manageability capabilities are provided using one or more distinct implementation classes for supporting a specific role, and for supporting management-discipline related aspects and behaviors needed by each of a plurality of resource management applications for managing the manageable resource. The one or more additional objects playing the role of the aspects each have an aspect life cycle that is bounded maximally by a subject lifecycle of the first manageable resource. The one or more additional objects are destroyed when the first object representing the manageable resource is destroyed.

System and computer program products corresponding to the above-summarized methods are also described and claimed herein. Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
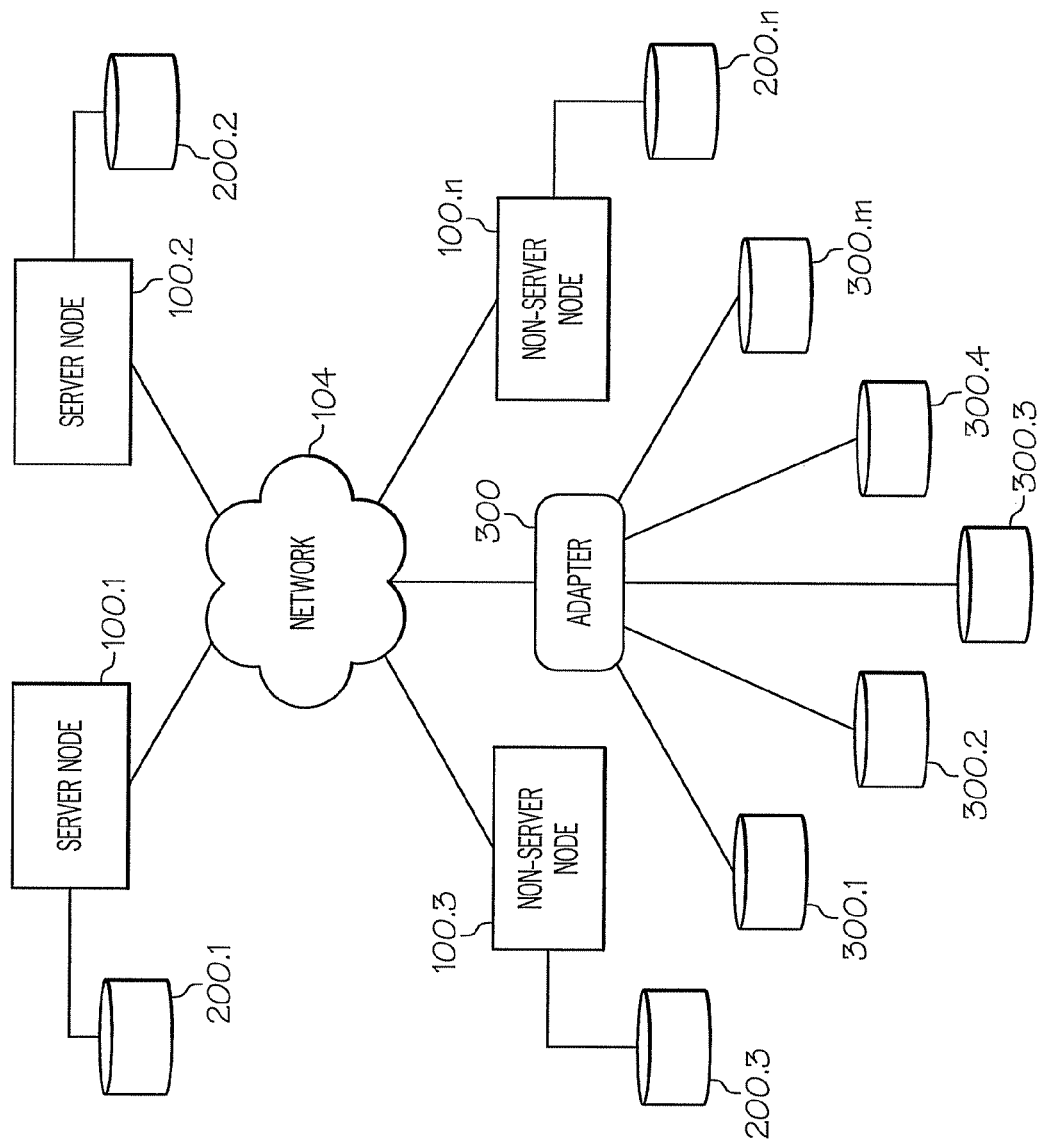
FIG. 1 is a block diagram setting forth an illustrative operational environment in which the present invention is employed.

FIG. 1 is a block diagram setting forth an illustrative operational environment in which the present invention is employed. In particular, a plurality of manageable resources in the form of nodes 100.1 through 100.n are interconnected over a network 104 through any suitable means, such as one or more adapters, cables, switches, wireless communication links, or any of various combinations thereof. In preferred embodiments of the present invention, each node 100.i of nodes 100.1 through 100.n is a processor node capable of communicating with other processor nodes using the publicly defined Transmission Control Protocol/Internet Protocol (TCP/IP) messaging protocol. While this protocol is referred to as an Internet Protocol, it should be noted that use of this term herein does not imply the existence of any Internet connection, nor does it imply dependence upon the Internet in any way. It is simply the name of a conveniently used, well characterized communication protocol suitable for use within a connected network of data processing nodes.

Each node 100.i may include one or more Central Processing Units (CPUs), some or all of which share memory with one another. This memory can be implemented using any computer readable storage medium such as electronic memory, magnetic memory, optical memory, or any of various combinations thereof. One or more of these CPUs are capable of implementing an operating system. Each node 100.i may be connected locally to a non-volatile storage device such as a Direct Access Storage Device (DASD) unit or other similar storage device 200.i, where i is an integer greater than or equal to 1, but less than or equal to n. Thus, each node 100.i is capable of performing I/O operations on a corresponding storage device 200.i.

Storage device 200.i typically comprises a rotating magnetic disk storage unit, sometimes referred to as a disk drive. However, the scope of the present invention includes any nonvolatile storage mechanism capable of holding data files. The number n of nodes 100.i is not critical. Furthermore, not everything operably coupled to network 104 has to be a data processing node. A plurality of DASD storage devices 300.1 through 300.m are connected to network 104 using, for example, a network adapter 300 for maintaining communication between DASD storage devices 300.1 to 300.m and network 104.

The nodes 100.i may contain additional software and hardware, a description of which is not necessary for understanding the invention. One or more of the nodes 100.i has stored therein data representing sequences of instructions which, when executed, cause the methods described hereinafter to be performed. Thus, one or more of the nodes 100.i include computer executable programmed instructions for directing the system of FIG. 1 to implement any of the embodiments of the present invention.

The programmed instructions may be embodied in at least one hardware, firmware, or software module resident in a memory associated with the one or more Central Processing Units (CPUs) of one or more nodes 100.i. This memory can be implemented using any computer readable storage medium such as electronic memory, magnetic memory, optical memory, or any of various combinations thereof. Alternatively or additionally, the programmed instructions may be embodied on a computer readable medium (such as a CD disk or floppy disk) which may be used for transporting the programmed instructions to the memory of the node 100.i. Alternatively or additionally, the programmed instructions may be embedded in a computer-readable, signal or signal-bearing medium that is uploaded to the node 100.i by a vendor or supplier of the programmed instructions, and this signal or signal-bearing medium may be downloaded through an interface to the node 100.i from the network 104 by end users or potential buyers.

In many situations, it is not necessary or desirable for the overall manageability of a resource to be designed and implemented by a single vendor or entity. Rather, it may be preferable for manageable resources to be represented by a combination of interfaces designed by several different designers or standards organizations. Looking ahead, implementations of manageability interfaces are likely to be constructed by multiple developers and organizations. Over time, the capabilities of a manageable resource may change as new software is provisioned into the environment. In order to minimize the disruption of adding new domain-specific capabilities to existing resources, it would be preferable if capabilities could be added to manageable resources in a dynamic manner, such that multiple manageable resources could be logically combined at deployment time or run time.

Figure 2:
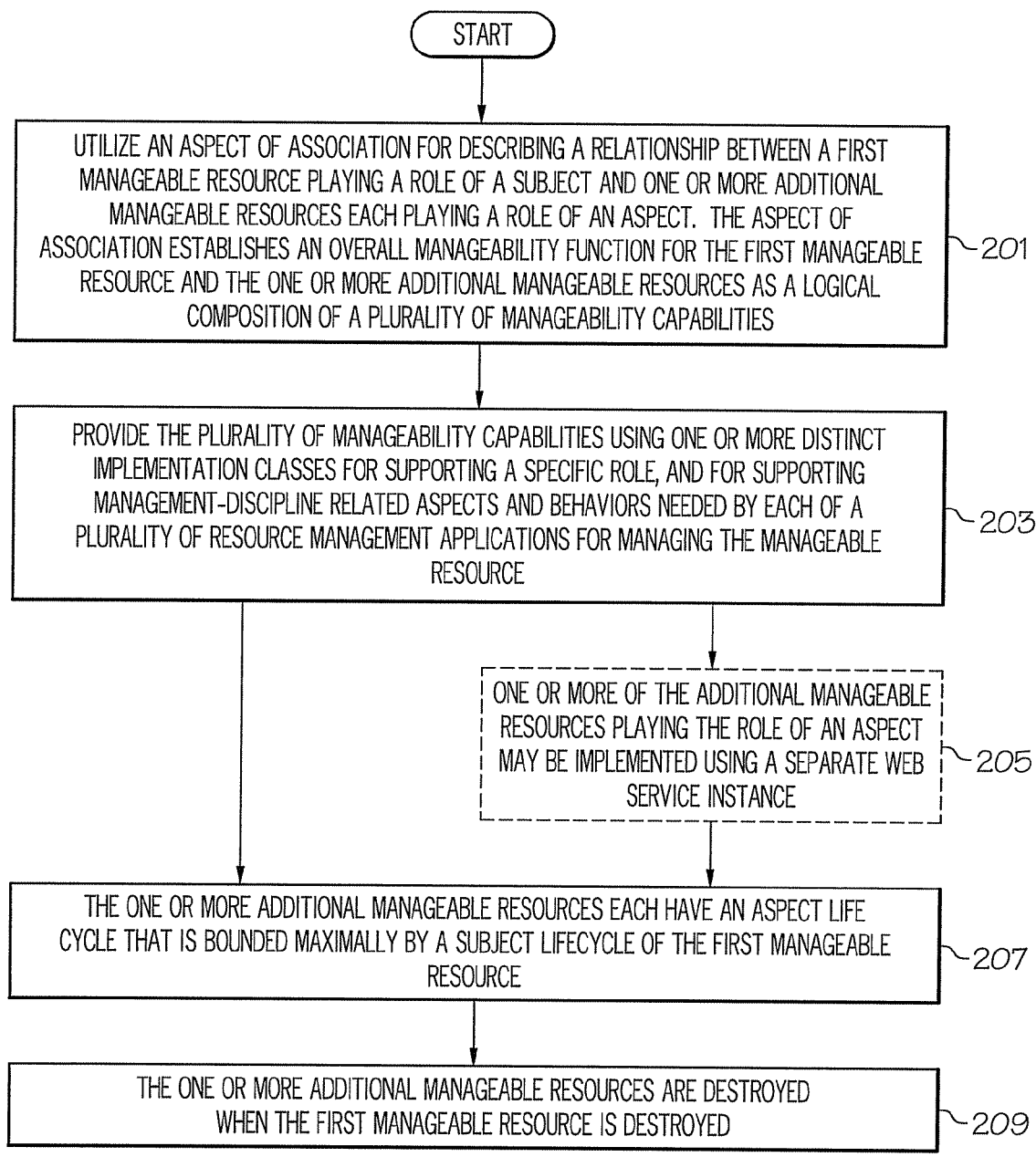
FIG. 2 is a flowchart setting forth an illustrative operational sequence for extending the manageability capabilities of resources through the use of manageability aspects.

FIG. 2 is a flowchart setting forth an illustrative operational sequence for extending the manageability capabilities of information technology (IT) resources through the use of manageability aspects. The procedure commences at block 201 where an "aspect of" association called AspectOf is utilized for describing a relationship between a first object representing the manageable resource playing a role of a subject and one or more additional objects implementing manageability capabilities each playing a role of an aspect. The AspectOf association establishes an overall manageability function for the first object representing the manageable resource and the one or more additional objects representing manageability aspects as a logical composition of a plurality of manageability capabilities. With reference to block 203, the manageability capabilities are provided using one or more distinct implementation classes for supporting a specific role, and for supporting management-discipline related aspects and behaviors needed by each of a plurality of resource management applications for managing the manageable resource.

Illustrative examples of aspects include, but are not limited to, support of resource monitoring, provisioning, operations management such as start and stop, performance, and availability management. In many cases, these aspects or logical extensions to the manageability of the resource are defined by different expert groups. These expert groups include specialists in each of various individual management disciplines or domains. Each of these aspects implements its own specific interface, allowing specific interaction with that aspect of the manageable resource. These aspects serve to logically extend the manageability interface of the subject manageable resource. Optionally, it may be possible for a given manageable resource instance to play multiple distinct roles in different relationships. For example, a given manageable resource instance may play the role of a subject in one relationship, and also play the role of an aspect in a separate and distinct relationship.

At optional block 205, one or more of the additional manageable resources playing the role of an aspect may, but need not, be implemented using a separate Web service instance. Illustratively, such a Web service instance may be supplied by a systems management product. Each manageability aspect itself may represent a separate manageable resource. Thus, the overall manageability of a manageable resource may be implemented by a plurality of separate and distinct manageable resource instances. Each of these implements its own specific interface, facilitating specific interaction with that aspect of the manageable resource subject.

With reference to block 207, the one or more additional objects representing the aspects each have an aspect life cycle that is bounded maximally by a subject lifecycle of the first object representing the manageable resource subject. The one or more additional objects representing the aspects are destroyed when the first object representing the manageable resource subject is destroyed (block 209).

Figure 3:
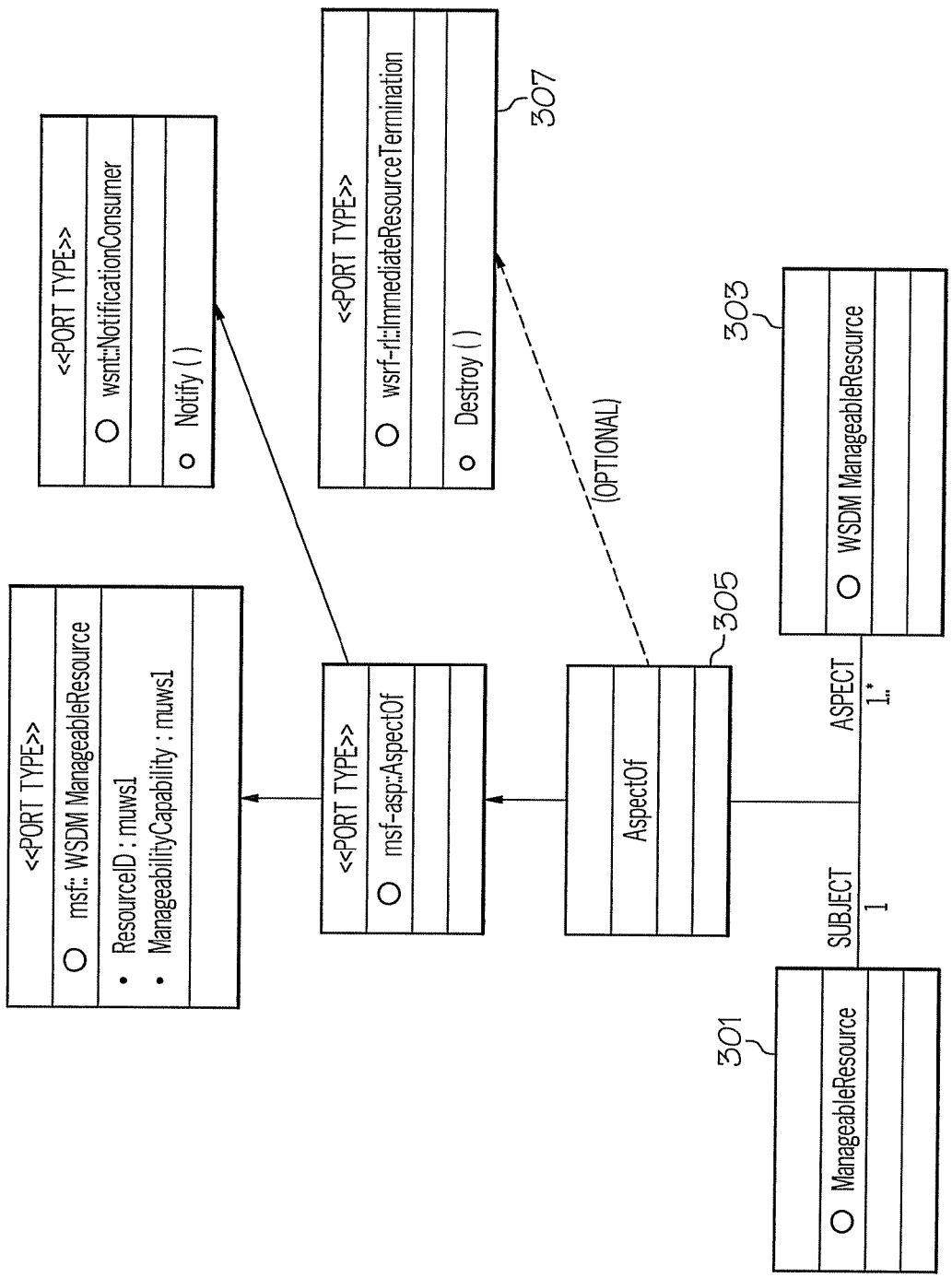
FIG. 3 is a class diagram illustrating a manageability aspect relationship for use with the operational sequence of FIG. 2.

FIG. 3 is a class diagram showing an exemplary interface composition manageability aspect relationship, AspectOf 305, for use with the operational sequence of FIG. 2. The AspectOf 305 relationship type describes a strongly typed relationship between an object representing a manageable resource playing the role of a subject 301 and one or more objects each playing the role of an aspect 303. An instance of an object playing the role of an aspect 303 can only participate in an AspectOf 305 relationship with a single subject 301.

The behavioral semantic of the AspectOf relationship type requires that the object playing the role of the aspect 303 has a life cycle that is bounded maximally by the life cycle of the manageable resource playing the role of the subject 301. Note that this life cycle constraint applies to the object playing the role of the aspect 303 only when the object is playing the role of an aspect in the AspectOf 305 relationship. If the AspectOf 305 relationship itself is terminated, this does not result in the destruction of the manageable object playing the role of the aspect 303. It simply means that the object playing the role of the aspect 303 is now not playing that role in the relationship since the relationship has been destroyed (block 307). Manageable resources that have the ability to play the role of an aspect 303, but are not in an AspectOf 305 relationship, are not subject to the life cycle constraints described herein.

Figure 4:
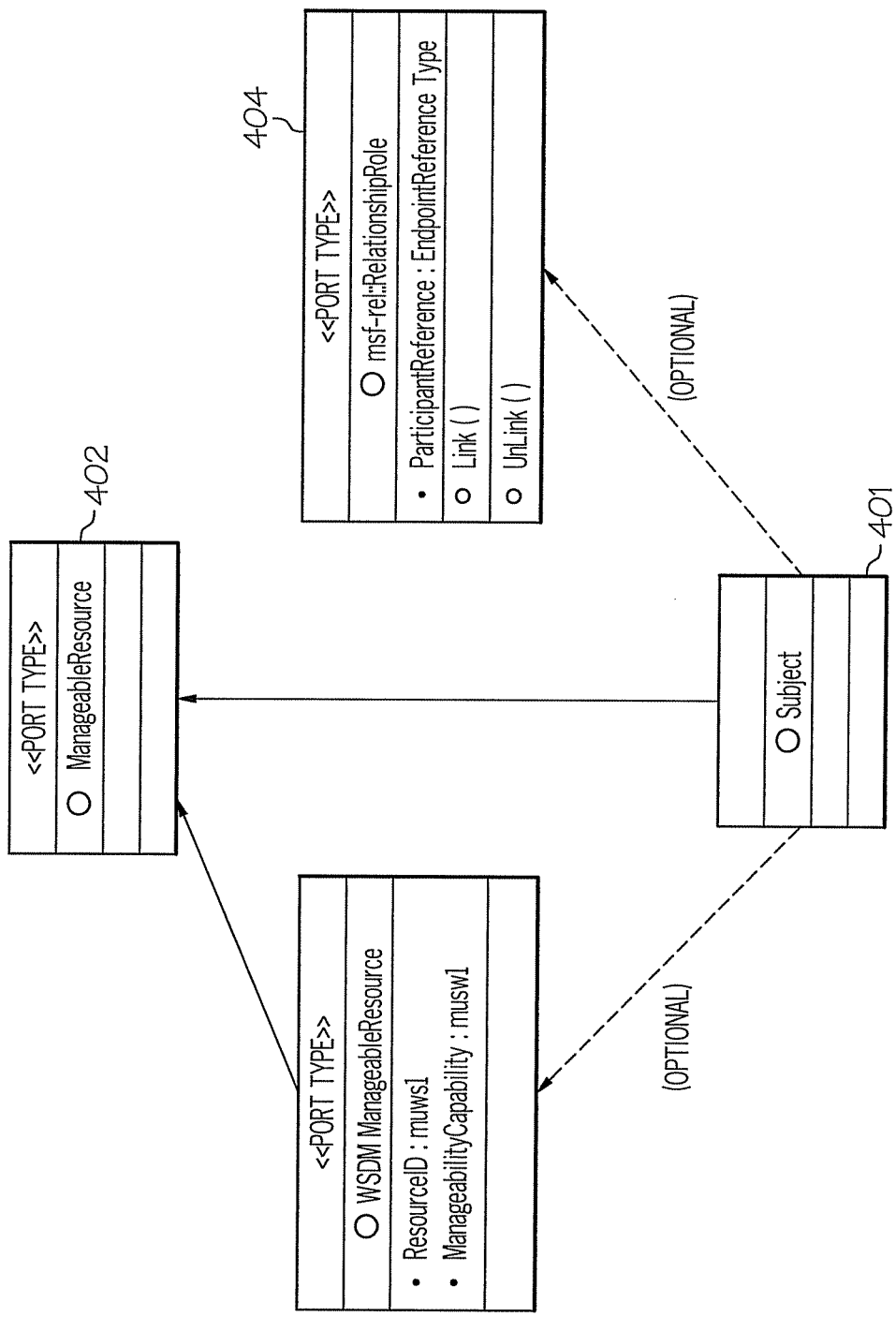
FIG. 4 is a class diagram for a subject of the manageability aspect relationship shown in FIG. 3.

FIG. 4 is a class diagram showing an exemplary interface composition for a subject 401 of the manageability aspect relationship, AspectOf 305, shown in FIG. 3. Illustratively, the subject 401 of FIG. 4 is substantially identical to the subject 301 of FIG. 3. The subject 401 (FIG. 4) role is assumed by a manageable resource 402 participant in an AspectOf 305 (FIG. 3) relationship that is being logically extended by the object instance playing the role of the aspect 303 (FIG. 3). The manageable resource playing the role of the subject 401 (FIG. 4) should have a well-defined and published life cycle. In the embodiment shown, if the manageable resource playing the role of the subject 401 is authoritative, it implements a msf-rel:RelationshipRole 404 interface as specified in a [VE-RELATIONSHIP] data structure construct. If the manageable resource playing the role of the subject 401 is non-authoritative, then there are no requirements placed upon the subject 401 by the AspectOf relationship 305 (FIG. 3).

Figure 5:
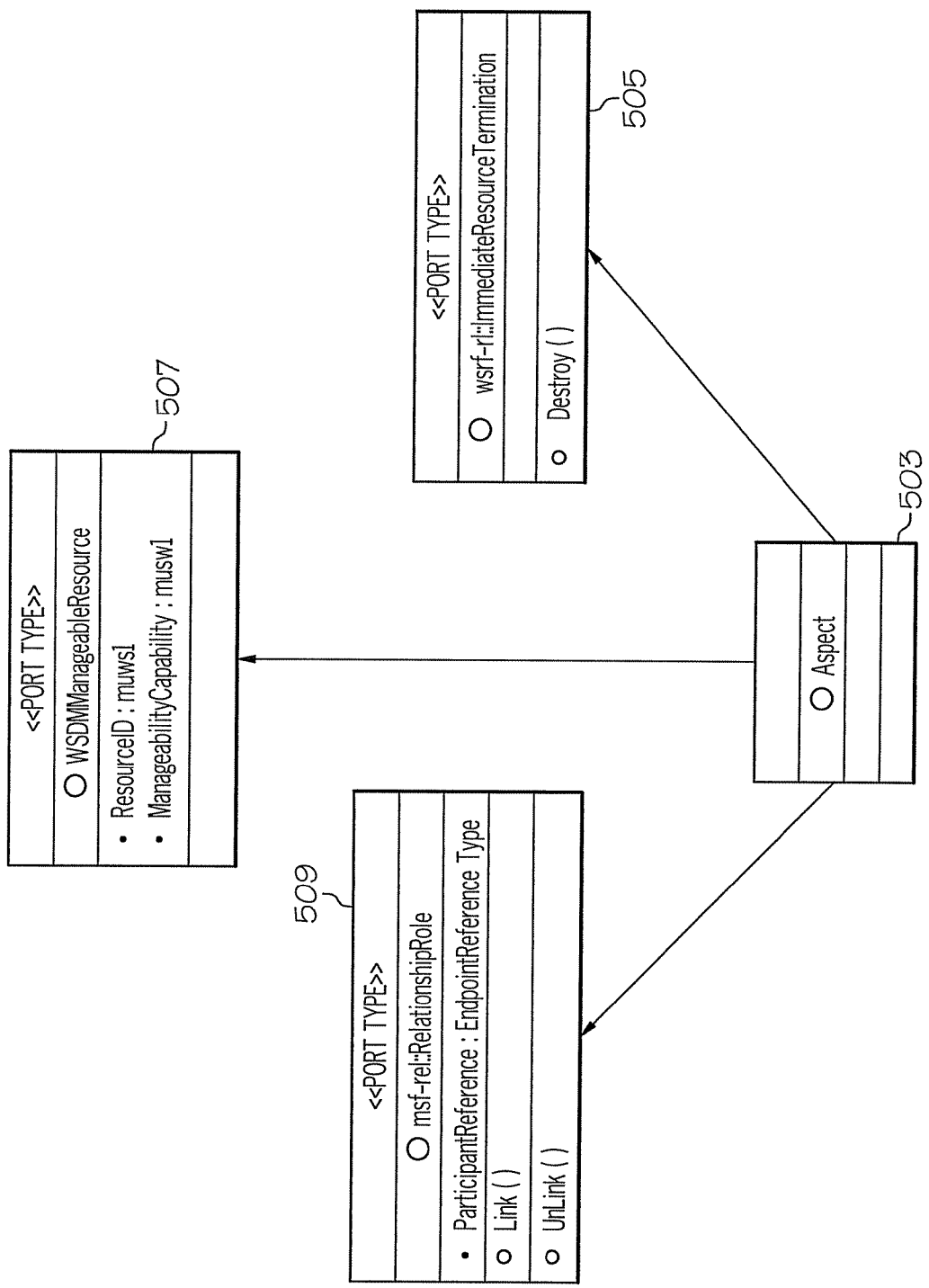
FIG. 5 is a class diagram showing an exemplary interface composition for an aspect of the manageability aspect relationship shown in FIG. 3.

FIG. 5 is a class diagram showing an exemplary interface composition for an aspect 503 of the manageability aspect relationship, AspectOf 305, shown in FIG. 3. Illustratively, the aspect 503 of FIG. 5 is substantially identical to the aspect 303 of FIG. 3. The manageable resource assuming the role of the aspect 503 (FIG. 5) must implement a wsrf-rl:ImmediateResourceTermination 505 interface because the aspect 503 has a life cycle that is bounded maximally to that of the subject 301 (FIG. 3) and 401 (FIG. 4). When the manageable resource playing the role of the subject 301, 401 in the AspectOf 305 (FIG. 3) relationship is terminated, the AspectOf 305 relationship must include some operation that destroys the manageable resource. The AspectOf 305 relationship instance must have a way of knowing what the destroy operation is, and how to invoke the destroy operation. Illustratively, the destroy operation is implemented by sending a Destroy message (FIG. 5, block 505) to a WSDM manageable resource (block 507) playing the role of the aspect 503.

The semantic meaning of a Destroy operation implemented by the manageable resource playing the role of the aspect 503 in response to receipt of the Destroy message is to terminate itself. The termination of an object playing the role of the aspect does not imply a termination of either its related subject 301, 401 (FIGS. 3 and 4, respectively), nor does this imply the termination of any other distinct aspect 503 (FIG. 5) related to the subject.

The object playing the role of the aspect 503 must implement a msf-rel:RelationshipRole 509 interface which enables the aspect 503 to implement the interactions necessary to participate in a relationship. For example, the msf-rel:RelationshipRole 509 interface is used to enable an object to play the role of an aspect 503 in the AspectOf 305 (FIG. 3) relationship.

The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer (such as, for example, one or more processing nodes 100.i of FIG. 1), the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:
1. A computer-executable method comprising:
 extending a plurality of manageability capabilities of manageable information technology (IT) resources, the resources including a first object representing a manageable resource playing a role of a subject (subject) and one or more additional objects each playing a role of an aspect (aspects), the extending comprising:

associating, utilizing an "aspect of" association, a subject and the one or more aspects, wherein the "aspect of" association establishes an overall manageability function for the subject and the aspects as a logical composition of a plurality of manageability capabilities, and wherein each aspect is a separate object from the subject;

providing the manageability capabilities using one or more distinct implementation classes that support a specific role, and that support management-discipline related aspects and behaviors needed by each of a plurality of resource management applications that manage the manageable resource, wherein the subject includes a subject lifecycle and the one or more aspects have an aspect life cycle that is bounded maximally by the subject lifecycle of the subject; and destroying the aspects when the subject is destroyed.

2. The method of claim 1 wherein the aspects each specify a role that includes at least one of: support of resource monitoring; provisioning; operations management; performance; availability, or security management.

3. The method of claim 1 wherein each aspect comprises a plurality of aspects.

4. The method of claim 3 wherein each of the plurality of aspects implements its own aspect-specific interface.

5. The method of claim 3 wherein the plurality of aspects serve to logically extend a manageability interface of the subject.

6. The method of claim 1 wherein a given manageable resource plays any one of a plurality of distinct roles in each of a plurality of different relationships.

7. The method of claim 6 wherein the given manageable resource plays a first role comprising a subject in a first relationship and plays a second role comprising an aspect in a second relationship, wherein the first relationship is separate and distinct from the second relationship.

8. A computer program product comprising a non-transitory storage medium readable by a processing circuit and storing instructions for execution by the processing circuit for facilitating a method comprising:

extending a plurality of manageability capabilities of manageable information technology (IT) resources by:

associating, utilizing an "aspect of" association, a first object representing a manageable resource playing a role of a subject and one or more additional objects each playing a role of an aspect, wherein the "aspect of" association establishes an overall manageability function for the subject and the aspects as a logical composition of a plurality of manageability capabilities, and wherein each aspect is separate object from the subject;

providing the manageability capabilities using one or more distinct implementation classes that support a specific role, and that support management-discipline related aspects and behaviors needed by each of a plurality of resource management applications that manage the manageable resource, wherein the one or more aspects have an aspect life cycle that is bounded maximally by a subject lifecycle of the subject; and destroying the aspects when the subject is destroyed.

9. The computer program product of claim 8 wherein the aspects each specify a role that includes at least one of: support of resource monitoring; provisioning; operations management; performance, or security management.

10. The computer program product of claim 8 wherein each aspect comprises a plurality of aspects.

11. The computer program product of claim 10 wherein each of the plurality of aspects implements its own aspect-specific interface.

12. The computer program product of claim 10 wherein the plurality of aspects serve to logically extend a manageability interface of the subject.

13. The computer program product of claim 8 wherein a given manageable resource plays any one of a plurality of distinct roles in each of a plurality of different relationships.

14. The computer program product of claim 13 wherein the given manageable resource plays a first role comprising a subject in a first relationship, and plays a second role comprising an aspect in a second relationship, wherein the first relationship is separate and distinct from the second relationship.

* * * * *